Oct. 29, 1957
J. R. HALL
2,811,052
SAW GULLET ANGLE INDICATOR
Filed March 30, 1956
2 Sheets-Sheet 1
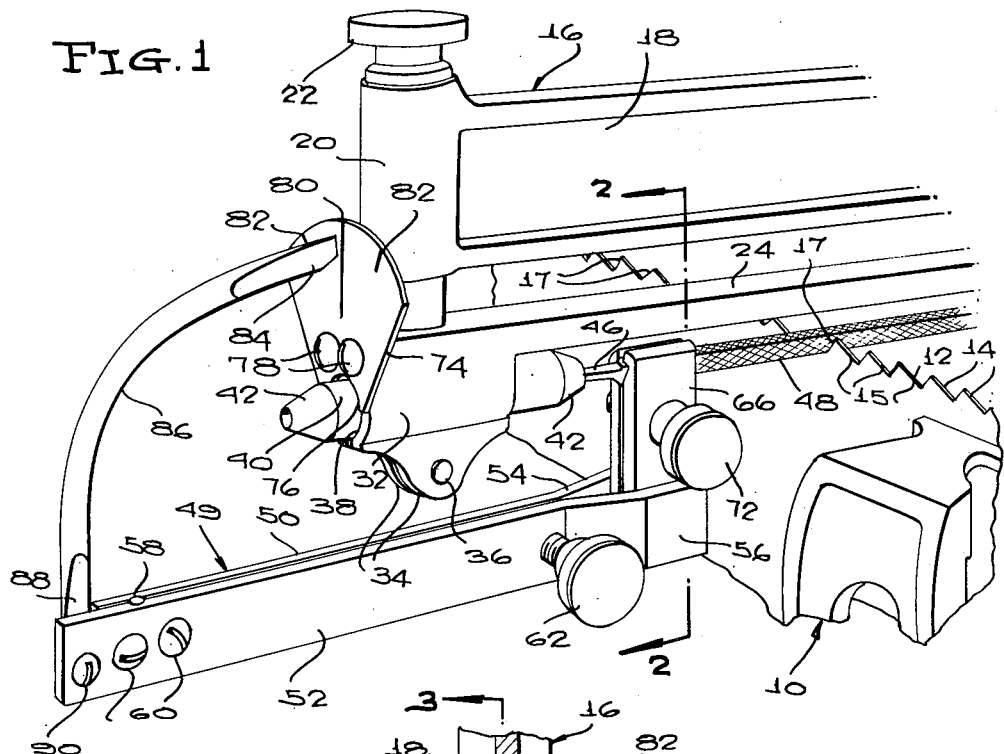
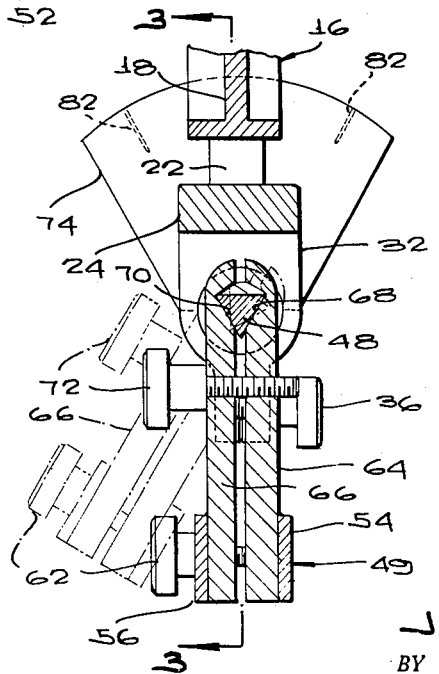
INVENTOR.
JOHN R. HALL
BY
*McMorrow, Berman & Davidson*
ATTORNEYS Oct. 29, 1957   J. R. HALL   2,811,052
SAW GULLET ANGLE INDICATOR
Filed March 30, 1956   2 Sheets-Sheet 2

INVENTOR.
JOHN R. HALL
BY
McMorrow, Berman & Davidson
ATTORNEYS

United States Patent Office 2,811,052
Patented Oct. 29, 1957

2,811,052

SAW GULLET ANGLE INDICATOR

John R. Hall, Colorado Springs, Colo.

Application March 30, 1956, Serial No. 575,123

3 Claims. (Cl. 76—31)

The present invention relates generally to attachments for saw filing machines. More particularly, the invention has reference to a saw gullet angle indicator, adapted for properly positioning the saw file.

Heretofore, a trial and error method has been utilized for the purpose of positioning the file used for the purpose of producing the selected pitch angle in the saw tooth gullets of the saw being serviced. This method is quite tedious, consumes an excessive amount of time, and often results in damaged or broken files.

The main object of the present invention is to provide a device designed to quickly and accurately position, to a predetermined saw gullet angle, any file having the cross sectional shape of an equilateral triangle, used in a saw filing machine for servicing hand, band, circular, cross cut, meat, and other types of saws.

Another object of importance is to provide a device of the type referred to which can be operated with maximum facility, in a period of time so small as to be inconsequential.

Another object is to provide a device of the nature referred to so designed that it will be completely unnecessary to adjust the filing machine to a position at right angles to the saw tooth line for the purpose of using the device, since the efficiency of the device is not affected by the beveling angle at which the filing arm of the machine is adjusted.

Another object is to provide a device of the type described that, once set in the desired position, will at all times permit speedy disposal of the file in said position each time the file is ready to be applied to the blade of the saw for the purpose of producing the desired pitch angle in each saw tooth gullet.

Summarized briefly, the invention comprises a vise carried by a pair of arms, so designed as to normally spring to a vise-closing position, so that the vise will grip the file after the file has been positioned in the vise and the arms have been released to shift into their normal relationship. Projecting from the ends of the arms opposite those on which the vise jaws are mounted is an elongated, curved index arm, terminating at its free end adjacent a quadrant having a series of indicia marked thereon. The quadrant is adapted for mounting upon the file support frame of the device, and rotatable in said file support frame is a tubular file holder, the tubular holder being in and of itself a conventional part of the saw filing machine. By first initially setting the file to produce the desired pitch angle, an index plate or quadrant is adapted to be properly located and permanently secured in a position effecting registration of a selected marking thereof with the index arm attached to the file through the medium of the vise and vise support arms. Thereafter, the file can be rotated out of the predetermined position during normal operation of the machine and servicing of a saw, and each time is rotated back to said position, accurately and speedily, by registering the index arm with the proper indicium of the index plate.

Other objects will appear from the following description, the claims appended thereto, and from the annexed drawing, in which like reference characters designate like parts throughout the several views, and wherein:

Figure 1 is a fragmentary perspective view of a saw filing machine to which is attached a saw gullet angle indicator formed according to the present invention;

Figure 2 is an enlarged section on line 2—2 of Figure 1, the dotted lines showing the vise and file rotated out of the normal, full lines position thereof;

Figure 3:
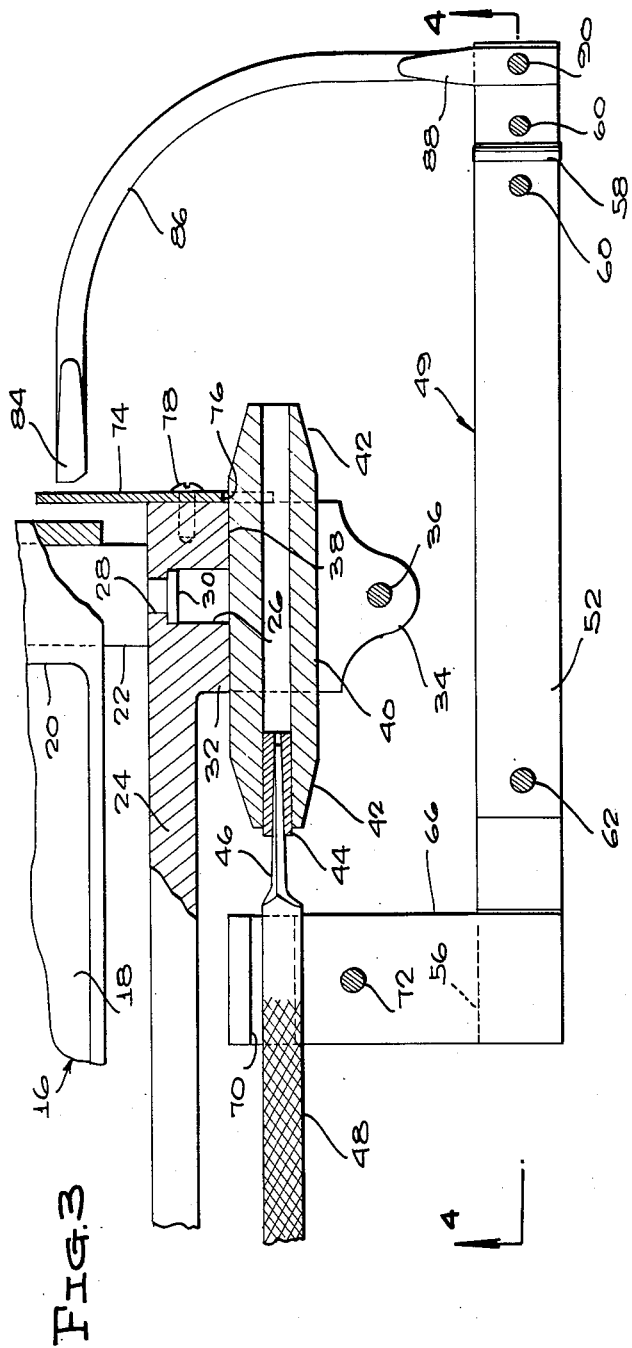
Figure 3 is a sectional view on the same scale as Figure 2, substantially on line 3—3 of Figure 2.

Referring to the drawings in detail, designated generally by the reference numeral 10 is a saw filing machine, in which is supportable a saw blade 12 that is to be filed, the saw blade having teeth 14 defining between them saw tooth gullets 15, the pitch angle of which is to be produced by the file carried by the machine. There are various standard pitch angles, which pitch angles may be defined as the angle of wall 17 of each tooth from the vertical. In some cases, wall 17 is at an angle of 45 degrees to the vertical. In other instances, the wall may be at an angle of 12 degrees to the vertical and in still other instances it may be, itself, wholly vertical. In this connection, various operators have differing practices with respect to fixing the pitch angle, and the invention permits each operator to select the particular, exact pitch angle that he prefers after which, once the device is set, the file each time it is rotated away from a position in which it will produce such angle, can be swiftly rotated back to said position.

Overlying and disposed transversely of the saw blade 12 that is being serviced is a file holder frame generally designated at 16, including a main bar 18 one end of which has a vertical sleeve 20 in which is provided an adjusting screw 22 used for effecting vertical adjustments of a file socket carrier bracket 24. As shown in Figure 3, this is provided, at the end thereof, illustrated, with a downwardly opening counterbore, 26 merging at its upper end into a reduced bore 28, the bore 28 receiving a reduced, depending axial extension of the rotary adjustment means 22, and said extension having a flat head 30 within the counterbore 26. The member 22, when rotated, is advanced vertically in a selected direction, thus to raise or lower the bracket 24.

The bracket 24 is provided with the adjustment means illustrated in Figure 3 at both ends of the bracket, and also provided at both ends of the bracket are depending, integral extensions 32, terminating at their lower ends in ears 34 having transversely aligned openings receiving a clamp bolt 36, it being understood that the opening of one of the ears would be threaded while the other is left smooth-walled, so that the ears can be drawn toward one another or shifted away from one another, responsive to rotation of the clamp bolt in a selected direction.

Above the ears, the extension 32 is provided with a horizontal bore 38, in which is mounted an elongated, tubular file socket 40 having tapered ends 42. In a conventional saw machine, there is provided a rear file socket carried by one end of the bracket 24 and a front file socket carried by the other end. The present invention is concerned only with one of said sockets, however, so reference to both sockets hereinafter is deemed unnecessary.

In the front file socket, with which the invention is concerned, there is provided a sleeve 44 inserted in the bore of the socket, and engageable in said sleeve is the tail 46 of a conventional file 48 of a cross section having the shape of an equilateral triangle. The file is adapted to produce the desired pitch angle by extension through each gullet 15 in turn, the file cutting away the wall 17 for this purpose.

To cause the file to produce the desired pitch angle, the face thereof bearing against wall 17 must be disposed at a corresponding angle from the vertical, and heretofore, the maintenance of the file face in the desired position has been a tedious, time-consuming operation. Normally pliers and similar tools have been employed, with the file being rotated into and out of the desired positions through the use of said tools.

It will be understood, at this point, that the sleeve 44 is fixedly engaged in the socket, with the tail 46 of the file being correspondingly fixedly engaged in the sleeve 44. Therefore, rotation of the socket 40 will effect conjoint rotation of the socket and file.

The parts so far described are wholly conventional in a saw filing machine and do not per se constitute part of the present invention.

Figure 4:
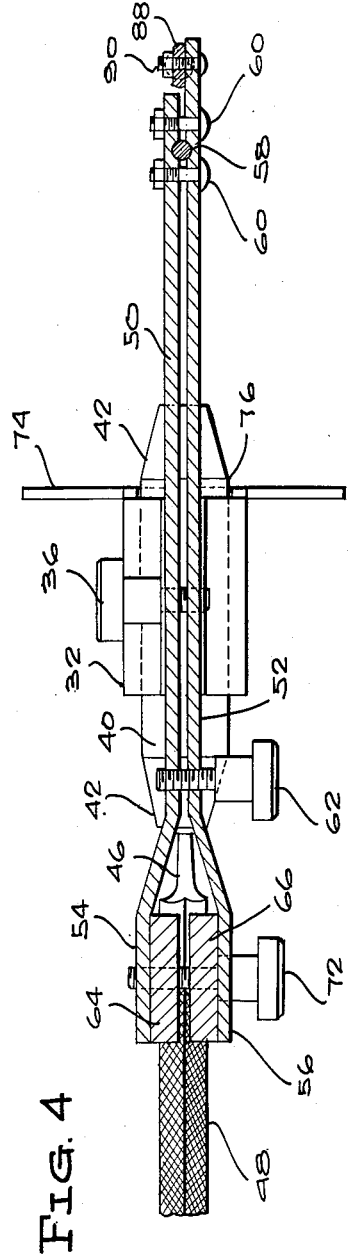
Figure 4 is a sectional view on the same scale as Figure 2, on line 4—4 of Figure 3.

In accordance with the present invention, there is provided a saw gullet angle indicator attachment generally designated 49, including a pair of elongated spring arms 50, 52 formed at their inner ends with divergent portions 54, 56 respectively. Adjacent the outer ends of the arms, said arms are provided with confronting, vertical recesses receiving a cylindrical pin 58, and at opposite sides of said pin, the arms are fixedly connected by bolts 60 (see Figure 4).

Adjacent the divergent inner end portions of the arms, said arms are provided with transversely aligned opening, one of which is threaded to receive a screw 62. The arms are spring tensioned to normally close at their free ends, that is, the ends remote from the connecting bolt 60. Accordingly, on rotation of the screw in one direction, the arms will be shifted apart against the inherent spring tension thereof. On rotation in an opposite direction, the arms are free to close under said spring tension, to shift toward one another vise plates 64, 66 that are welded or otherwise fixedly secured to the respective divergent portions of the arms and project upwardly from the arms in closely spaced relation.

Formed in the upper end portions of the arms are confronting, angular recesses 68, 70, adapted to receive the file 48 as shown in Figure 2, so that when the vise plates or jaws close upon the file, the file is fixedly engaged with the vise plates. A screw 72 extends through transversely aligned openings of the vice plates a short distance below the recesses 68, 70, and when tightened is adapted to tighten the jaws to the vise plates.

It will be seen that on rotation of screw 62 in one direction with screw 72 backed out of its associated openings to a selected degree, the vise jaws will be opened against the spring the arm 50, 52 to receive the file. Then, by rotation of the screw 62 in an opposite direction, the vise jaws under the spring tension of the arms will automatically close upon the file, after which the screw 72 is tightened.

A quadrant or indexing plate, of segmental shape, has been designated at 74, and at its lower, smaller end has a recess 76 providing clearance for the socket 40. A pair of screws 78 extend through openings of the plate 74, and are threaded into the adjacent end of the bracket 24 to fixedly connect the plate to the bracket. To permit preadjustment of the plate to its desired position, the openings of the plate through which the screw 78 extends may be formed as arcuate slots curved about the axis of the socket 40.

Marked upon the face of the plate 24 are indicia 80, 82 the indicium 80 being a center marking and the indicia 82 being side markings. The center marking is used in connection with the normal position of the socket and file, in which position the file is located for producing a proper pitch angle in the saw tooth gullet, while the markings 82 are used for other pitch angles to which it may be desired to adjust the file.

Adapted to be registered with a selected indicium 80 or 82 is the pointed free end 84 of an elongated, curved index arm 86 the other end of which is flattened as at 88 and is secured by a bolt 90 or the like to the arm 52.

In installation of the device, the file is first properly positioned preliminary to installation of the attachment 49. In this connection, the initial step on the part of the operator is to set up a saw blade 12 in the filing machine, the saw tooth gullets of which are to be filed to a particular pitch angle. The machine is put into operation and produces the saw tooth gullet having the exact pitch angle which the particular operator desires to use, it being true as previously mentioned that different operators have different concepts as to the pitch angle that should be employed. With the file properly positioned to produce the desired gullet or pitch angle, the operator attaches the plate 74 permanently to the file socket bracket 24 with the file remaining in the selected position. Then, the vise is opened to receive the file at its widest end, that is, the end adjacent the tail 46. Thereafter, the vise jaws are closed and clamped to the file in the manner previously described herein. This fixedly connects the vise to the file.

This will result in the automatic disposition of the index arm at a particular location upon the face of the plate 74, which location is that at which the index arm, arms 50, 52 and vise plates 64, 66 must be positioned whenever the file is in its proper pitch angle producing location or position.

The operator now calibrates the plate, producing thereon a marking 80 registered with the finger or sharpened end 84 of the index arm. The same procedure is followed for indexing any other gullet angles that the operator may desire to use, this producing the markings 82.

Now, the device is ready for use, and each time the file 48 is rotated with socket 40 out of the prescribed position, the index arm will move away from the indicium 80 (or 82 as the case may be). When the file is rotated back to its desired position, the position is found immediately by registration of the finger 84 with the indicium 80.

It will be seen, further, that the vise jaws constitute a handle facilitating rotation of the file, thus eliminating the use of pliers, which has heretofore been the conventional practice.

The construction, as will be appreciated, results in a swift and accurate positioning of the file, each time the same is to be located for producing the desired gullet angle. Further, the invention has the desirable characteristic that it does not involve modification or redesign of the saw filing machine, permits normal use of the saw filing machine, and is adapted to permit the swift attachment or detachment of files. On removal of a worn file, and replacement thereof by a new file of the same size and cross sectional shape, the new file will automatically be properly disposed for use.

It is believed apparent that the invention is not necessarily confined to the specific use or uses thereof described above, since it may be utilized for any purpose to which is may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a saw gullet angle indicator for a saw filing machine the combination, with a file support bracket and a file socket rotating in said bracket, said socket adapted to engage, for rotation with the socket, a saw file aligned coaxially with the socket of: vise means comprising a pair of vise plates having confronting recesses adapted for engagement of a saw file carried by the said socket, said vise plates extending rearwardly of the socket; an index plate fixedly connected to said bracket; a pair of arms secured to the vise means and extending parallel to the socket at the ends of the plates remote from the socket, said arms being spreadable for shifting the vise plates toward and away from each other; and an index arm rigid with at least one of the first named arms and disposed in position to traverse said plate, whereby to be registrable with a selected indicium of the plate responsive to rotation of the vise means, arms and index arm conjointly with the socket and file, said index arm comprising an elongated, curved member fixedly anchored at one end to one of the vise plate supporting arms, the index arm at its other end being pointed and extending in closely spaced relation to the plate.

2. In a saw gullet angle indicator for a saw filing machine the combination, with a file support bracket and a file socket rotating in said bracket, said socket adapted to engage, for rotation with the socket, a saw file aligned coaxially with the socket of: vise means comprising a pair of vise plates having confronting recesses adapted for engagement of a saw file carried by the said socket, said vise plates extending rearwardly of the socket; an index plate fixedly connected to said bracket; a pair of arms secured to the vise means and extending parallel to the socket at the ends of the plates remote from the socket, said arms being spreadable for shifting the vise plates toward and away from each other; and an index rigid with at least one of the first named arms and disposed in position to traverse said plate, whereby to be registrable with a selected indicium of the plate responsive to rotation of the vise means, arms and index arm conjointly with the socket and file, said index arm comprising an elongated, curved member fixedly anchored at one end to one of the vise plate supporting arms, the index arm at its other end being pointed and extending in closely spaced relation to the plate, said vise means including a screw extending through the respective vice plates and adapted for shifting the vise plates toward one another into clamping engagement with said file.

3. In a saw gullet angle indicator for a saw filing machine the combination, with a file support bracket and a file socket rotating in said bracket, said socket adapted to engage, for rotation with the socket, a saw file aligned coaxially with the socket of: vise means comprising a pair of vise plates having confronting recesses adapted for engagement of a saw file carried by the said socket, said vise plates extending rearwardly of the socket; an index plate fixedly connected to said bracket; a pair of arms secured to the vise means and extending parallel to the socket at the ends of the plates remote from the socket, said arms being spreadable for shifting the vise plates toward and away from each other; and an index rigid with at least one of the first named arms and disposed in position to traverse said plate, whereby to be registrable with a selected indicium of the plate responsive to rotation of the vise means, arms and index arm conjointly with the socket and file, said index arm comprising an elongated, curved member fixedly anchored at one end to one of the vise plate supporting arms, the index arm at its other end being pointed and extending in closely spaced relation to the plate, said vise means including a screw extending through the respective vise plates and adapted for shifting the vise plates toward one another into clamping engagement with said file, said vise plate supporting arms being of a springable material and being tensioned to normally shift the vise plates toward each other.

References Cited in the file of this patent

UNITED STATES PATENTS

| | | |
|---|---|---|
| 195,633 | Murphin | Sept. 25, 1877 |
| 586,508 | Morrison | July 13, 1897 |
| 1,457,880 | Masow | June 5, 1923 |
| 2,482,694 | Shearer | Sept. 20, 1949 |

FOREIGN PATENTS

| | | |
|---|---|---|
| 460,537 | Canada | Oct. 25, 1949 |